United States Patent
Yeh

(10) Patent No.: US 11,466,348 B2
(45) Date of Patent: Oct. 11, 2022

(54) HIGH STRENGTH AND LOW MODULUS ALLOY AND ARTICLE COMPRISING THE SAME

(71) Applicant: National Tsing Hua University, Hsinchu (TW)

(72) Inventor: Jien-Wei Yeh, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 17/351,232

(22) Filed: Jun. 18, 2021

(65) Prior Publication Data
US 2022/0235440 A1 Jul. 28, 2022

(30) Foreign Application Priority Data
Jan. 27, 2021 (TW) .................................. 110102924

(51) Int. Cl.
| | |
|---|---|
| *C22C 30/04* | (2006.01) |
| *C22C 16/00* | (2006.01) |
| *C22C 14/00* | (2006.01) |
| *C22F 1/18* | (2006.01) |

(52) U.S. Cl.
CPC .............. *C22C 30/04* (2013.01); *C22C 14/00* (2013.01); *C22C 16/00* (2013.01); *C22F 1/183* (2013.01); *C22F 1/186* (2013.01)

(58) Field of Classification Search
CPC ......... C22C 14/00; C22C 16/00; C22C 30/04; C22F 1/183; C22F 1/186
See application file for complete search history.

(56) References Cited

FOREIGN PATENT DOCUMENTS

WO WO-0068448 A1 * 11/2000 ......... A61F 2/30767

* cited by examiner

*Primary Examiner* — Jessee R Roe

(57) ABSTRACT

A high strength and low modulus alloy is disclosed, and comprises at least five principal elements and at least one additive element. The principal elements are Ti, Zr, Nb, Mo, and Sn, and the additive element(s) are V, W, Cr, and/or Hf. Particularly, a summation of numeric values of Ti and Zr in atomic percent is less than or equal to 85, and the additive elements have a total numeric value in atomic percent less than or equal to 4. Experimental data reveal that, samples of the high strength and low modulus alloy all have properties of yield strength greater than 600 MPa and Young's modulus less than 90 GPa. As a result, experimental data have proved that the high strength and low modulus alloy has a significant potential for applications in the manufacture of various industrial components and/or devices, medical devices, and surgical implants.

10 Claims, No Drawings

HIGH STRENGTH AND LOW MODULUS ALLOY AND ARTICLE COMPRISING THE SAME

BACKGROUND OF THE INVENTION

1. Field of the Invention

The present invention relates to the technology field of alloy materials, and more particularly to a high strength and low modulus alloy and an article comprising the same.

2. Description of the Prior Art

Material engineers should know that, in case of a specific material exhibiting one outstanding mechanical characteristic, the specific material certainly shows average, not good or poor performance in another one mechanical characteristic. For example, in spite of having high strength and Young's modulus up to hundreds of GPa, metal material's elastic strain limit is commonly less than 0.2%. On the contrary, rubber material is known having good elasticity, but its strength is commonly less than 100 MPa.

Titanium-based alloy is one kind of high strength and low modulus alloy, and is suitable for being applied in technology fields of aerospace, ships, chemical, automobiles, sports equipment, medical devices, biomedical materials (surgical implants), golf clubs, etc. For example, Ti-6Al-4V alloy has properties of yield strength greater than 850 MPa and Young's modulus greater than 100 GPa. Compared to traditional metals or alloys, Young's modulus (>100 GPa) of the Ti-6Al-4V alloy is not high, but even so the elasticity of the Ti-6Al-4V alloy is still not outstanding, causing that the Ti-6Al-4V alloy is not broadly applied to high-elasticity-requirement applications.

Researches have found that, β-titanium alloy has good elasticity because of containing beta stabilizing elements. For instance, Young's modulus of Ti—Nb—Zr alloy is less than 50 GPa. However, it is a pity that the commercial Ti—Nb—Zr alloys all can only show a yield strength up to 600 MPa.

From above descriptions, it is understood that there is still room for improvement in the conventional titanium-based alloy. In view of that, inventors of the present invention have made great efforts to make inventive research and eventually provided a high strength and low modulus alloy and an article comprising the same.

SUMMARY OF THE INVENTION

The primary objective of the present invention is to disclose a high strength and low modulus alloy, which comprises at least five principal elements and at least one additive element. The principal elements are Ti, Zr, Nb, Mo, and Sn, and the additive element(s) are V, W, Cr, and/or Hf Particularly, a summation of numeric values of Ti and Zr in atomic percent is less than or equal to 85, and the additive elements have a total numeric value in atomic percent less than or equal to 4. Experimental data reveal that, samples of the high strength and low modulus alloy all have properties of yield strength greater than 600 MPa and Young's modulus less than 90 GPa. As a result, experimental data have proved that the high strength and low modulus alloy has significant potential for applications in the manufacture of various industrial components, devices, medical devices, and/or surgical implants.

In order to achieve the primary objective of the present invention, inventors of the present invention provide a first embodiment of the high strength and low modulus alloy, which has a plurality of properties that comprises yield strength greater than 600 MPa and Young's modulus less than 90 GPa, and has an elemental composition of $Ti_rZr_sNb_tMo_xSn_yM_a$;

wherein M represents at least one additive element selected from a group consisting of V, W, Cr, and Hf;

wherein r, s, t, x, y, and a are numeric values of Ti, Zr, Nb, Mo, Sn, and M in atomic percent, respectively; and wherein r, s, t, x, y, and a satisfy $15 \leq r \leq 50$, $26 \leq s \leq 50$, $3 \leq t \leq 20$, $x \leq 3.5$, $y \leq 12$, $a \leq 4$, and $(r+s) \leq 85$.

For carrying out the objective of the present invention, inventors of the present invention provide a second embodiment of the high strength and low modulus alloy, which has a plurality of properties that comprises yield strength greater than 600 MPa and Young's modulus less than 90 GPa, and has an elemental composition of $Ti_rZr_sNb_tMo_xSn_yTa_zM_a$;

wherein M represents at least one additive element selected from a group consisting of V, W, Cr, and Hf;

wherein r, s, t, x, y, z, and a are numeric values of Ti, Zr, Nb, Mo, Sn, Ta, and M in atomic percent, respectively; and wherein r, s, t, x, y, z, and a satisfy $15 \leq r \leq 50$, $26 \leq s \leq 50$, $3 \leq t \leq 20$, $x \leq 3.5$, $y \leq 12$, $z \leq 5$, $a \leq 4$, and $(r+s) \leq 85$.

In order to achieve the primary objective of the present invention, inventors of the present invention provide a third embodiment of the high strength and low modulus alloy, which has a plurality of properties that comprises yield strength greater than 600 MPa and Young's modulus less than 90 GPa, and has an elemental composition of $Ti_rZr_sNb_tMo_xSn_yM_aN_b$;

wherein M represents at least one first additive element selected from a group consisting of V, W, Cr, and Hf;

wherein N represents at least one second additive element selected from a group consisting of Cu, Al, Ni, Au, Ag, Fe, Co, Mn, Zn, Pb, Ge, P, Mg, Ce, Y, La, Sb, C, Si, B, and O;

wherein r, s, t, x, y, a, and b are numeric values of Ti, Zr, Nb, Mo, Sn, M, and N in atomic percent, respectively; and wherein r, s, t, x, y, a, and b satisfy $15 \leq r \leq 50$, $26 \leq s \leq 50$, $3 \leq t \leq 20$, $x \leq 3.5$, $y \leq 12$, $a \leq 4$, $b \leq 5$, and $(r+s) \leq 85$.

For carrying out the objective of the present invention, inventors of the present invention provide a fourth embodiment of the high strength and low modulus alloy, which has a plurality of properties that comprises yield strength greater than 600 MPa and Young's modulus less than 90 GPa, and has an elemental composition of $Ti_rZr_sNb_tMo_xSn_yTa_zM_aN_b$;

wherein M represents at least one first additive element selected from a group consisting of V, W, Cr, and Hf;

wherein N represents at least one second additive element selected from a group consisting of Cu, Al, Ni, Au, Ag, Fe, Co, Mn, Zn, Pb, Ge, P, Mg, Ce, Y, La, Sb, C, Si, B, and O;

wherein r, s, t, x, y, z, a, and b are numeric values of Ti, Zr, Nb, Mo, Sn, Ta, M, and N in atomic percent, respectively; and wherein r, s, t, x, y, z, a, and b satisfy $15 \leq r \leq 50$, $26 \leq s \leq 50$, $3 \leq t \leq 20$, $x \leq 3.5$, $y \leq 12$, $z \leq 5$, $a \leq 4$, $b \leq 5$, and $(r+s) \leq 85$.

In practicable embodiment, the high strength and low modulus alloy according to the present invention is produced by using a manufacturing method selected from a group consisting of: vacuum arc melting process, electric resistance wire heating process, electric induction heating process, rapid solidification process, mechanical alloying process, and powder metallurgical process.

In practicable embodiment, the high strength and low modulus alloy according to the present invention is processed to be an article selected from a group consisting of powder article, wire article, welding rod, flux cored wire, plate article, and bulk article.

Moreover, the present invention also discloses an article, which is selected from a group consisting of surgical implant, medical device and industrially-producible product, and is made of the high strength and low modulus alloy according to the present invention.

DETAILED DESCRIPTION OF THE PREFERRED EMBODIMENTS

To more clearly describe a high strength and low modulus alloy and an article comprising the same, embodiments of the present invention will be described in detail with reference to the attached drawings hereinafter.

First Embodiment

In the first embodiment, the high strength and low modulus alloy is designed to have an elemental composition of $Ti_rZr_sNb_tMo_xSn_yM_a$, so as to exhibit a plurality of specific properties that comprises yield strength greater than 600 MPa and Young's modulus less than 90 GPa. As described in more detail below, M represents at least one additive element selected from a group consisting of V, W, Cr, and Hf. Moreover, the forgoing r, s, t, x, y, and a are numeric values of Ti, Zr, Nb, Mo, Sn, and M in atomic percent, respectively. Particularly, r, s, t, x, y, and a satisfy $15 \le r \le 50$, $26 \le s \le 50$, $3 \le t \le 20$, $x \le 3.5$, $y \le 12$, $a \le 4$, and $(r+s) \le 85$. For example, the high strength and low modulus alloy is designed to comprise: 48 at % Ti, 28 at % Zr, 15 at % Nb, 3 at % Mo, and 6 at % Sn. In such case, the high strength and low modulus alloy has an elemental composition of $Ti_{48}Zr_{28}Nb_{15}Mo_3Sn_6$. That is, r=48, s=28, t=15, x=3, y=6, and a=0.

Second Embodiment

In the second embodiment, the high strength and low modulus alloy is designed to have an elemental composition of $Ti_rZr_sNb_tMo_xSn_yTa_zM_a$, so as to exhibit a plurality of specific properties that comprises yield strength greater than 600 MPa and Young's modulus less than 90 GPa. As described in more detail below, M represents at least one additive element selected from a group consisting of V, W, Cr, and Hf. Moreover, the forgoing r, s, t, x, y, z, and a are numeric values of Ti, Zr, Nb, Mo, Sn, Ta, and M in atomic percent, respectively. Particularly, r, s, t, x, y, z, and a satisfy $15 \le r \le 50$, $26 \le s \le 50$, $3 \le t \le 20$, $x \le 3.5$, $y \le 12$, $z \le 5$, $a \le 4$, and $(r+s) \le 85$. For example, the high strength and low modulus alloy is designed to comprise: 48 at % Ti, 28 at % Zr, 12.5 at % Nb, 3.5 at % Mo, 2 at % Sn, 3 at % Ta, 2 at % Cr, and 1 at % W. In such case, the high strength and low modulus alloy has an elemental composition of $Ti_{48}Zr_{28}Nb_{12.5}Mo_{3.5}Sn_2Ta_3Cr_2W_1$. That is, r=48, s=28, t=12.5, x=3.5, y=2, z=3, and a=2+1=3.

Third Embodiment

In the third embodiment, the high strength and low modulus alloy is designed to have an elemental composition of $Ti_rZr_sNb_tMo_xSn_yM_aN_b$, so as to exhibit a plurality of specific properties that comprises yield strength greater than 600 MPa and Young's modulus less than 90 GPa. As described in more detail below, M represents at least one additive element selected from a group consisting of V, W, Cr, and Hf, and N represents at least one second additive element selected from a group consisting of Cu, Al, Ni, Au, Ag, Fe, Co, Mn, Zn, Pb, Ge, P, Mg, Ce, Y, La, Sb, C, Si, B, and O. Moreover, the forgoing r, s, t, x, y, a, and b are numeric values of Ti, Zr, Nb, Mo, Sn, M, and N in atomic percent, respectively. Particularly, r, s, t, x, y, a, and b satisfy $15 \le r \le 50$, $26 \le s \le 50$, $3 \le t \le 20$, $x \le 3.5$, $y \le 12$, $a \le 4$, $b \le 5$, and $(r+s) \le 85$. For example, the high strength and low modulus alloy is designed to comprise: 48 at % Ti, 26 at % Zr, 7 at % Nb, 3 at % Mo, 12 at % Sn, 2 at % V, and 2 at % Cu. In such case, the high strength and low modulus alloy has an elemental composition of $Ti_{48}Zr_{26}Nb_7Mo_3Sn_{12}V_2Cu_2$. That is, r=48, s=26, t=7, x=3, y=12, a=2, and b=2.

Fourth Embodiment

In the fourth embodiment, the high strength and low modulus alloy is designed to have an elemental composition of $Ti_rZr_sNb_tMo_xSn_yTa_zM_aN_b$, so as to exhibit a plurality of specific properties that comprises yield strength greater than 600 MPa and Young's modulus less than 90 GPa. As described in more detail below, M represents at least one additive element selected from a group consisting of V, W, Cr, and Hf, and N represents at least one second additive element selected from a group consisting of Cu, Al, Ni, Au, Ag, Fe, Co, Mn, Zn, Pb, Ge, P, Mg, Ce, Y, La, Sb, C, Si, B, and O. Moreover, the forgoing r, s, t, x, y, z, a, and b are numeric values of Ti, Zr, Nb, Mo, Sn, Ta, M, and N in atomic percent, respectively. Particularly, r, s, t, x, y, z, a, and b satisfy $15 \le r \le 50$, $26 \le s \le 50$, $3 \le t \le 20$, $x \le 3.5$, $y \le 12$, $z \le 5$, $a \le 4$, $b \le 5$, and $(r+s) \le 85$. For example, the high strength and low modulus alloy is designed to comprise: 48 at % Ti, 29 at % Zr, 3 at % Nb, 3 at % Mo, 9 at % Sn, 4 at % Ta, 1 at % V, 2 at % Co, and 1 at % Si. In such case, the high strength and low modulus alloy has an elemental composition of $Ti_{48}Zr_{29}Nb_3Mo_3Sn_9Ta_4V_1Co_2Si_1$. That is, r=48, s=29, t=3, x=3, y=9, z=4, a=1, and b=2+1=3.

It is worth mentioning that, the high strength and low modulus alloy according to the present invention can be produced by using a manufacturing method selected from a group consisting of: vacuum arc melting process, electric resistance wire heating process, electric induction heating process, rapid solidification process, mechanical alloying process, and powder metallurgical process. Moreover, the high strength and low modulus alloy can be processed to be an article selected from a group consisting of powder article, wire article, welding rod, flux cored wire, plate article, and bulk article.

Therefore, engineers skilled in development and manufacture of alloys are certainly able to fabricate a specific article comprising the high strength and low modulus alloy according to the present invention, such as a surgical implant, a medical device or an industrially-producible product. In practicable embodiments, the surgical implant can be an artificial hip joint, an artificial knee joint, a joint button, a bone plate, a bone screw, a spicule, a dental crown, an abutment post for supporting the dental crown, a bridge, a partial denture, etc. On the other hand, the medical device can be a scalpel's blade, a hemostatic forceps, a surgical scissor, an electric bone drill, a tweezer, a blood vessel suture needle, a sternum suture thread, and so on. Moreover, the industrially-producible product is like a spring, a coil, a wire, a clamp, a fastener, a blade, a valve, a elastic sheet, a spectacle frame, sports equipment, and so forth. As explained in more detail below, processing method for achieving the fabrication of the specific article can be casting method, electric-arc welding method, thermal spraying method, thermal sintering method, laser welding method, plasma-arc welding method, 3D additive manufacturing method, mechanical process method, or chemical process method.

It is worth mentioning that, inventors of the present invention have completed experiments in order to prove that the high strength and low modulus alloy of the present invention can indeed be made.

First Experiment

In the first experiment, samples of the high strength and low modulus alloy according to the present invention are fabricated by using vacuum arc melting method. Following Table (1) lists each sample's elemental composition. Moreover, the samples of the high strength and low modulus alloy are all treated with a tensile test, and related measurement data are recorded in the following Table (1).

TABLE 1

| samples | Elemental composition | Yield strength (MPa) | Young's modulus (GPa) |
| --- | --- | --- | --- |
| No. 1 | $Ti_{48}Zr_{28}Nb_{15}Mo_3Sn_6$ | 915 | 79.7 |
| No. 2 | $Ti_{48}Zr_{28}Nb_{12.5}Mo_{3.5}Sn_2Ta_3Cr_2W_1$ | 973 | 85.3 |
| No. 3 | $Ti_{48}Zr_{26}Nb_7Mo_3Sn_{12}V_2Cu_2$ | 988 | 89.5 |
| No. 4 | $Ti_{48}Zr_{29}Nb_3Mo_3Sn_9Ta_4V_1Co_2Si_1$ | 994 | 89.8 |
| No. 5 | $Ti_{48}Zr_{26}Nb_{12}Mo_2Sn_2Ta_5Hf_2Ni_2Al_1$ | 995 | 83.2 |
| No. 6 | $Ti_{40}Zr_{40}Nb_5Mo_{3.5}Sn_{6.5}Ta_2Cr_3$ | 1056 | 82.5 |
| No. 7 | $Ti_{40}Zr_{35}Nb_8Mo_{3.5}Sn_{6.5}V_4Fe_3$ | 1098 | 85.6 |
| No. 8 | $Ti_{40}Zr_{33}Nb_{14}Mo_3Sn_3W_4Zn_3$ | 1103 | 87.3 |
| No. 9 | $Ti_{40}Zr_{38}Nb_{11}Mo_3Sn_3Cr_2Mn_2O_1$ | 1122 | 83.1 |
| No. 10 | $Ti_{40}Zr_{31}Nb_{13}Mo_3Sn_8V_2Ge_2P_1$ | 1156 | 89.1 |

From the forgoing Table (1), it is easy to find that, the 10 samples have included the first embodiment, the second embodiment, the third embodiment, and the fourth embodiment of the high strength and low modulus alloy. The most important thing is that the 10 samples of the high strength and low modulus alloy all include following characteristics: yield strength greater than 600 MPa and Young's modulus less than 90 GPa.

Second Experiment

In the second experiment, samples of the high strength and low modulus alloy according to the present invention are also fabricated by using vacuum arc melting method. Following Tables (2) and (3) list each sample's elemental composition. Moreover, the samples of the high strength and low modulus alloy are all treated with a tensile test, and related measurement data are recorded in the following Tables (2) and (3).

TABLE 2

| samples | Elemental composition | Yield strength (MPa) | Young's modulus (GPa) |
| --- | --- | --- | --- |
| No. 11 | $Ti_{35}Zr_{40}Nb_{15}Mo_2Sn_8$ | 1049 | 80.3 |
| No. 12 | $Ti_{35}Zr_{31}Nb_{16}Mo_3Sn_8Ta_3Cr_4$ | 1083 | 86.7 |
| No. 13 | $Ti_{35}Zr_{37}Nb_{17}Mo_{3.5}Sn_{0.5}Ta_1V_4Y_2$ | 993 | 82.3 |
| No. 14 | $Ti_{35}Zr_{36}Nb_{17}Mo_3Sn_4Ta_1Hf_1Au_2C_1$ | 1105 | 89.9 |
| No. 15 | $Ti_{35}Zr_{35}Nb_{18}Mo_2Sn_5Ta_1W_1Mg_2B_1$ | 1139 | 89.8 |
| No. 16 | $Ti_{32}Zr_{33}Nb_{20}Mo_{0.5}Sn_{7.5}Ta_3V_4$ | 1021 | 79.2 |

TABLE 2-continued

| samples | Elemental composition | Yield strength (MPa) | Young's modulus (GPa) |
| --- | --- | --- | --- |
| No. 17 | $Ti_{32}Zr_{37}Nb_{20}Mo_2Sn_2Ta_3Cr_4$ | 1047 | 85.4 |
| No. 18 | $Ti_{32}Zr_{36}Nb_{17}Mo_3Sn_7Ta_1Cr_2W_2$ | 1083 | 86.9 |
| No. 19 | $Ti_{32}Zr_{33}Nb_{17}Mo_3Sn_9Ta_2V_1La_3$ | 1189 | 89.9 |
| No. 20 | $Ti_{32}Zr_{35}Nb_{15}Mo_{3.5}Sn_{8.5}Ta_1W_2Ag_2Pb_1$ | 1096 | 87.1 |

TABLE 3

| samples | Elemental composition | Yield strength (MPa) | Young's modulus (GPa) |
| --- | --- | --- | --- |
| No. 21 | $Ti_{27}Zr_{29}Nb_{20}Mo_{3.5}Sn_{10.5}Ta_3Cr_4Cu_2Sb_1$ | 1159 | 89.7 |
| No. 22 | $Ti_{27}Zr_{37}Nb_{18}Mo_3Sn_6Ta_2V_4Ni_2Ce_1$ | 1119 | 88.5 |
| No. 23 | $Ti_{27}Zr_{37}Nb_{16}Mo_1Sn_{12}Ta_2Cr_1W_1Al_3$ | 1138 | 89.3 |
| No. 24 | $Ti_{27}Zr_{48}Nb_{12}Mo_3Sn_3Ta_1Cr_3Co_2O_1$ | 1219 | 89.3 |
| No. 25 | $Ti_{27}Zr_{44}Nb_{15}Mo_2Sn_5Ta_1V_3Fe_1Mn_1C_1$ | 1183 | 85.9 |
| No. 26 | $Ti_{20}Zr_{40}Nb_{18}Mo_{3.5}Sn_{9.5}Ta_5V_1Ge_3$ | 1149 | 89.6 |
| No. 27 | $Ti_{20}Zr_{48}Nb_{13}Mo_3Sn_7Ta_5V_1Zn_2B_1$ | 1208 | 89.8 |
| No. 28 | $Ti_{20}Zr_{50}Nb_{17}Mo_3Sn_3Ta_1Cr_3W_1Y_2$ | 1143 | 89.3 |
| No. 29 | $Ti_{20}Zr_{50}Nb_{20}Mo_3Sn_1Ta_2Hf_2La_1Si_1$ | 1089 | 87.7 |
| No. 30 | $Ti_{20}Zr_{43}Nb_{18}Mo_3Sn_9Ta_2V_1Cr_1Pb_2P_1$ | 1209 | 88.1 |

From the forgoing Tables (2) and (3), it is easy to find that, the 20 samples of the high strength and low modulus alloy all include the characteristics of yield strength greater than 600 MPa and Young's modulus less than 90 GPa.

Therefore, through above descriptions, all embodiments and their experimental data of the high strength and low modulus alloy according to the present invention have been introduced completely and clearly; in summary, the present invention includes the advantages of:

(1) The present invention discloses a high strength and low modulus alloy, which comprises at least five principal elements and at least one additive element. The principal elements are Ti, Zr, Nb, Mo, and Sn, and the additive element(s) are V, W, Cr, and/or Hf Particularly, a summation of numeric values of Ti and Zr in atomic percent is less than or equal to 85, and the additive elements have a total numeric value in atomic percent less than or equal to 4. Experimental data have proved that, samples of the high strength and low modulus alloy all have properties of yield strength greater than 600 MPa and Young's modulus less than 90 GPa (2) According to the experimental data, it is believed that the high strength and low modulus alloy of the present invention has a significant potential for applications in the manufacture of various industrial components and/or devices, medical devices, and surgical implants.

The above description is made on embodiments of the present invention. However, the embodiments are not intended to limit scope of the present invention, and all equivalent implementations or alterations within the spirit of the present invention still fall within the scope of the present invention.

What is claimed is:

1. An alloy, having a plurality of properties that comprise yield strength greater than 600 MPa and Young's modulus less than 90 GPa, and having an elemental composition of $Ti_rZr_sNb_tMo_xSn_yM_a$;

wherein M represents at least one additive element selected from a group consisting of V, W, Cr, and Hf;

wherein r, s, t, x, y, and a are numeric values of Ti, Zr, Nb, Mo, Sn, and M in in atomic percent, respectively; and wherein r, s, t, x, y, and a satisfy 15≤r≤50, 26≤s≤50, 3≤t≤18, 0<x≤3.5, 0<y≤12, a≤4, and (r+s)≤85.

2. The alloy of claim 1, wherein a metal element Ta is added into the elemental composition, thereby making the elemental composition become $Ti_rZr_sNb_tMo_xSn_yTa_zM_a$; wherein z satisfies z≤5.

3. The alloy of claim 1, being produced by using a manufacturing method selected from a group consisting of: vacuum arc melting process, electric resistance wire heating process, electric induction heating process, rapid solidification process, mechanical alloying process, and powder metallurgical process.

4. The alloy of claim 1, wherein the high strength and low modulus alloy is processed to be an article selected from a group consisting of powder article, wire article, welding rod, flux cored wire, plate article, and bulk article.

5. An article, being made of an alloy material having an elemental composition of $Ti_rZr_sNb_tMo_xSn_yM_a$;
   wherein M represents at least one additive element selected from a group consisting of V, W, Cr, and Hf;
   wherein r, s, t, x, y, and a are numeric values of Ti, Zr, Nb, Mo, Sn, and M in in atomic percent, respectively;
   wherein r, s, t, x, y, and a satisfy 15≤r≤50, 26≤s≤50, 3≤t≤18, 0<x≤3.5, 0<y≤12, a≤4, and (r+s)≤85; and
   wherein the article is selected from a group consisting of surgical implant, medical device and industrially-producible product.

6. An alloy, having a plurality of properties that comprise yield strength greater than 600 MPa and Young's modulus less than 90 GPa, and having an elemental composition of $Ti_rZr_sNb_tMo_xSn_yM_aN_b$;
   wherein M represents at least one first additive element selected from a group consisting of V, W, Cr, and Hf;
   wherein N represents at least one second additive element selected from a group consisting of Cu, Al, Ni, Au, Ag, Fe, Co, Mn, Zn, Pb, Ge, P, Mg, Ce, Y, La, Sb, C, Si, B, and O;
   wherein r, s, t, x, y, a, and b are numeric values of Ti, Zr, Nb, Mo, Sn, M, and N in atomic percent, respectively; and
   wherein r, s, t, x, y, and a satisfy 15≤r≤50, 26≤s≤50, 3≤t≤18, 0<x≤3.5, 0<y≤12, a≤4, and (r+s)≤85.

7. The alloy of claim 6, wherein a metal element Ta is added into the elemental composition, thereby making the elemental composition become $Ti_rZr_sNb_tMo_xSn_yTa_zM_aN_b$; wherein z satisfies z≤5.

8. The alloy of claim 6, being produced by using a manufacturing method selected from a group consisting of: vacuum arc melting process, electric resistance wire heating process, electric induction heating process, rapid solidification process, mechanical alloying process, and powder metallurgical process.

9. The alloy of claim 6, wherein the high strength and low modulus alloy is processed to be an article selected from a group consisting of powder article, wire article, welding rod, flux cored wire, plate article, and bulk article.

10. A article, being made of an alloy material having an elemental composition of $Ti_rZr_sNb_tMo_xSn_yM_aN_b$;
   wherein M represents at least one first additive element selected from a group consisting of V, W, Cr, and Hf;
   wherein N represents at least one second additive element selected from a group consisting of Cu, Al, Ni, Au, Ag, Fe, Co, Mn, Zn, Pb, Ge, P, Mg, Ce, Y, La, Sb, C, Si, B, and O;
   wherein r, s, t, x, y, a, and b are numeric values of Ti, Zr, Nb, Mo, Sn, M, and N in atomic percent, respectively;
   wherein r, s, t, x, y, and a satisfy 15≤r≤50, 26≤s≤50, 3≤t≤18, 0<x≤3.5, 0<y≤12, a≤4, and (r+s)≤85; and
   wherein the article is selected from a group consisting of surgical implant, medical device and industrially-producible product.

* * * * *